United States Patent
Goda et al.

(10) Patent No.: US 10,288,931 B2
(45) Date of Patent: May 14, 2019

(54) LCD DEVICE

(71) Applicant: ZEON CORPORATION, Chiyoda-ku, Tokyo (JP)

(72) Inventors: Kazuya Goda, Tokyo (JP); Yoshinori Fujii, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/762,168

(22) PCT Filed: Sep. 27, 2016

(86) PCT No.: PCT/JP2016/078419
§ 371 (c)(1),
(2) Date: Mar. 22, 2018

(87) PCT Pub. No.: WO2017/057347
PCT Pub. Date: Apr. 6, 2017

(65) Prior Publication Data
US 2018/0259812 A1 Sep. 13, 2018

(30) Foreign Application Priority Data
Sep. 30, 2015 (JP) .................................. 2015-193909

(51) Int. Cl.
*G02F 1/1335* (2006.01)
*G02F 1/13363* (2006.01)
(Continued)

(52) U.S. Cl.
CPC ......... *G02F 1/133528* (2013.01); *G02B 5/30* (2013.01); *G02B 5/3083* (2013.01);
(Continued)

(58) Field of Classification Search
CPC ............... G02F 1/1336; G02F 1/13363; G02F 1/133615; G02F 1/133528; G02F 1/1343;
(Continued)

(56) References Cited

U.S. PATENT DOCUMENTS

| 6,642,985 | B2 | 11/2003 | Kim et al. |
| 7,580,099 | B2 | 8/2009 | Ichihashi |
| 8,274,627 | B2 | 9/2012 | Tomonaga et al. |
| 9,651,819 | B2 | 5/2017 | Chang et al. |
| 2015/0355503 | A1 | 12/2015 | Chang et al. |

FOREIGN PATENT DOCUMENTS

| JP | 2002031812 A | 1/2002 |
| JP | 2007298960 A | 11/2007 |

(Continued)

OTHER PUBLICATIONS

Apr. 3, 2018, International Preliminary Report on Patentability issued in the International Patent Application No. PCT/JP2016/078419.

*Primary Examiner* — Thoi V Duong
(74) *Attorney, Agent, or Firm* — Kenja IP Law PC

(57) ABSTRACT

A liquid crystal display device includes a first polarizing plate, an optically anisotropic body (B), an optically anisotropic body (A), a liquid crystal cell of a horizontal orientation mode, and a second polarizing plate having a polarized light transmission axis which is approximately perpendicular to a polarized light transmission axis of the first polarizing plate, in this order from a viewing side. The optically anisotropic body (A) is formed of a material having a negative intrinsic birefringence value. The optically anisotropic body (B) is formed of a material having a positive intrinsic birefringence value. In-plane slow axes of the optically anisotropic bodies (A, B) are approximately parallel to each other. The in-plane slow axis of the optically anisotropic body (B) is approximately perpendicular to the polarized light transmission axis of the first polarizing plate. Retardations of the optically anisotropic bodies (A, B) are in specific ranges.

4 Claims, 6 Drawing Sheets

(51) Int. Cl.
*G02B 5/30* (2006.01)
*G02F 1/137* (2006.01)

(52) U.S. Cl.
CPC .......... *G02F 1/137* (2013.01); *G02F 1/13363* (2013.01); *G02F 1/133602* (2013.01); *G02F 2001/13706* (2013.01); *G02F 2001/13712* (2013.01)

(58) Field of Classification Search
CPC ............ G02F 1/134363; G02F 1/1335; G02F 1/133603; G02F 1/1313; G02F 1/133602; G02F 2001/133531; G02F 2001/133638; G02F 2001/133635; G02F 2001/133562; G02F 2001/133631; G02F 2001/133538; G02F 2001/133738; G02F 2202/40; G02F 2413/08; G02F 2413/06; G02F 2413/03; G02F 2413/09; G02F 2203/05; G02B 5/3083; G02B 5/30; G02B 5/3025
See application file for complete search history.

(56) References Cited

FOREIGN PATENT DOCUMENTS

| | | |
|---|---|---|
| JP | 2010217870 A | 9/2010 |
| JP | 4882223 B2 | 2/2012 |
| JP | 4938632 B2 | 5/2012 |
| JP | 2012514222 A | 6/2012 |
| JP | 2014013414 A | 1/2014 |
| WO | 2010074543 A2 | 7/2010 |

LCD DEVICE

FIELD

The present invention relates to a liquid crystal display device.

BACKGROUND

In a liquid crystal cell of a horizontal orientation mode such as an in-plane switching mode (IPS), liquid crystal molecules are oriented in parallel to the surface of a substrate, and properties thereof such as a viewing angle property are excellent. Therefore, various studies are conducted on a liquid crystal display device including such a liquid crystal cell of a horizontal orientation mode (see Patent Literatures 1 to 6).

CITATION LIST

Patent Literature

Patent Literature 1: Japanese Patent No. 4938632 B
Patent Literature 2: Japanese Patent Application Laid-Open No. 2007-298960 A
Patent Literature 3: Japanese Patent Application Laid-Open No. 2014-13414 A
Patent Literature 4: Japanese Patent No. 4882223 B
Patent Literature 5: Japanese Patent Application Laid-Open No. 2010-217870 A
Patent Literature 6: Japanese Translation of PCT Patent Application Publication No. 2012-514222 A

SUMMARY

Technical Problem

From the viewpoint of the improvement of image quality, brightness of the liquid crystal display device is preferably low when a black image is displayed by blocking light transmission. Hereinafter, the brightness when a black image is displayed may be appropriately referred to as a "black brightness". However, with regard to a liquid crystal display device including a liquid crystal cell of a horizontal orientation mode, a black brightness observed from a tilt direction is sometimes high, even if a black brightness observed from a front direction is low.

The present invention has been devised in view of the aforementioned problem. An object of the present invention is to provide a liquid crystal display device including a liquid crystal cell of a horizontal orientation mode, which can lower a brightness observed from a tilt direction when a black image is displayed.

Solution to Problem

The present inventor intensively conducted researches for solving the aforementioned problem. As a result, the inventor has found that a brightness observed from a tilt direction when a black image is displayed can be lowered by disposing a specific optically anisotropic body (A) and optically anisotropic body (B) between a viewing side polarizing plate and a liquid crystal cell in a liquid crystal display device including a liquid crystal cell of a horizontal orientation mode. Thus, the present invention has been accomplished.

That is, the present invention is as follows.

(1) A liquid crystal display device comprising a first polarizing plate, an optically anisotropic body (B), an optically anisotropic body (A), a liquid crystal cell of a horizontal orientation mode, and a second polarizing plate having a polarized light transmission axis which is approximately perpendicular to a polarized light transmission axis of the first polarizing plate, in this order from a viewing side, wherein the optically anisotropic body (A) is formed of a material having a negative intrinsic birefringence value, the optically anisotropic body (B) is formed of a material having a positive intrinsic birefringence value, an in-plane slow axis of the optically anisotropic body (A) and an in-plane slow axis of the optically anisotropic body (B) are approximately parallel to each other, the in-plane slow axis of the optically anisotropic body (B) is approximately perpendicular to the polarized light transmission axis of the first polarizing plate, an in-plane retardation Re(A550) at a wavelength of 550 nm of the optically anisotropic body (A) is 10 nm or more and 50 nm or less, a thickness direction retardation Rth(A550) at a wavelength of 550 nm of the optically anisotropic body (A) is −70 nm or more and −10 nm or less, an in-plane retardation Re(B550) at a wavelength of 550 nm of the optically anisotropic body (B) is 200 nm or more and 500 nm or less, and a thickness direction retardation Rth(B550) at a wavelength of 550 nm of the optically anisotropic body (B) is 100 nm or more and 250 nm or less.

(2) The liquid crystal display device according to (1), wherein an in-plane retardation Re(A450) at a wavelength of 450 nm, the in-plane retardation Re(A550) at a wavelength of 550 nm, and an in-plane retardation Re(A650) at a wavelength of 650 nm of the optically anisotropic body (A) satisfy $0.80 \leq Re(A450)/Re(A550) \leq 1.09$ and
$0.97 \leq Re(A650)/Re(A550) \leq 1.20$, and an in-plane retardation Re(B450) at a wavelength of 450 nm, the in-plane retardation Re(B550) at a wavelength of 550 nm, and, an in-plane retardation Re(B650) at a wavelength of 650 nm of the optically anisotropic body (B) satisfy $0.97 \leq Re(B450)/Re(B550) \leq 1.09$ and
$0.97 \leq Re(B650)/Re(B550) \leq 1.03$.

(3) The liquid crystal display device according to (1) or (2), comprising the first polarizing plate, the optically anisotropic body (B), the optically anisotropic body (A), the liquid crystal cell, the second polarizing plate, and a backlight unit, in this order, wherein a black brightness of the liquid crystal display device when the liquid crystal display device is observed from a direction at a polar angle of 60° and an azimuth angle of 45° with respect to the polarized light transmission axis of the first polarizing plate is 1.4 or less, in terms of a relative brightness based on a brightness of the backlight unit alone that is lit and observed from a front direction being 100.0.

Advantageous Effects of Invention

According to the present invention, there can be provided a liquid crystal display device including a liquid crystal cell of a horizontal orientation mode, which can lower a brightness observed from a tilt direction when a black image is displayed.

DESCRIPTION OF EMBODIMENTS

Figure 1:
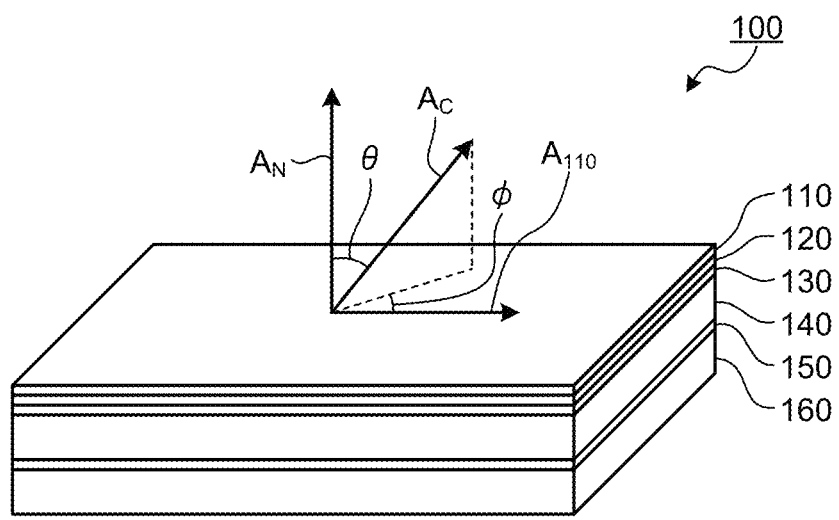
FIG. 1 is a perspective view schematically illustrating a liquid crystal display device according to an embodiment of the present invention.

Hereinafter, the present invention will be described in detail by illustrating embodiments and examples. However, the present invention is not limited to the embodiments and examples described below, and may be optionally modified for implementation without departing from the scope of claims of the present invention and its equivalents.

An in-plane retardation of a film is a value represented by $(nx-ny) \times d$, unless otherwise stated. A thickness direction retardation of a film is a value represented by $\{(nx+ny)/2-nz\} \times d$, unless otherwise stated. An NZ factor of a film is a value represented by $(nx-nz)/(nx-ny)$, unless otherwise stated. $nx$ herein represents a refractive index in a direction that gives the maximum refractive index among the directions which are perpendicular to the thickness direction (in-plane directions) of the film. $ny$ represents a refractive index in a direction that is perpendicular to the $nx$ direction among the aforementioned in-plane directions of the film. $nz$ represents a refractive index in the thickness direction of the film. $d$ represents the thickness of the film. Unless otherwise stated, the wavelength for measuring the aforementioned retardation is 550 nm. The aforementioned retardation may be measured using a commercially available phase difference measuring device (for example, a polarimeter ("Axoscan" manufactured by Axiometric Inc.), "KOBRA-21ADH" manufactured by Oji Sceientific Instruments, "WPA-micro" manufactured by Photonic Lattice, Inc.), or the Senarmont method.

In the following description, a material having a positive intrinsic birefringence value means a material whose refractive index in a stretching direction is larger than the refractive index in a direction orthogonal to the stretching direction, unless otherwise stated. A material having a negative intrinsic birefringence value means a material whose refractive index in a stretching direction is smaller than the refractive index in a direction orthogonal to the stretching direction, unless otherwise stated. The intrinsic birefringence value of a material may be calculated from a dielectric constant distribution.

In the following description, "(meth)acryl" includes both "acryl" and "methacryl", and "(meth)acrylonitrile" includes both "acrylonitrile" and "methacrylonitrile".

In the following description, the front direction of a liquid crystal display device means the normal line direction of the display surface of the liquid crystal display device, unless otherwise stated. Specifically, the front direction indicates a direction at a polar angle of 0° and at an azimuth angle of 0° of the display surface.

In the following description, the tilt direction of a liquid crystal display device means a direction that is neither parallel nor perpendicular to the display surface of the liquid crystal display device, unless otherwise stated. Specifically, the tilt direction indicates a direction at a polar angle of more than 0° and less than 90° of the display surface.

In the following description, the "long-length" film refers to a film having a length that is 5 times or more and preferably 10 times or more its width. Specifically, the "long-length" film means a film having a length with which the film can be wound up into a roll shape to be stored or transported.

In the following description, the "polarizing plate" includes not only a rigid member, but also a flexible member such as a resin film, unless otherwise stated.

In the following description, an angle formed between optical axes (a polarized light transmission axis, a polarized light absorption axis, a slow axis, and the like) of two optical members is an angle when the optical members are viewed from their thickness directions, unless otherwise stated.

In the following description, the slow axis of a film represents an in-plane slow axis of the film, unless otherwise stated.

[1. Embodiments of Liquid Crystal Display Device]

Figure 2:
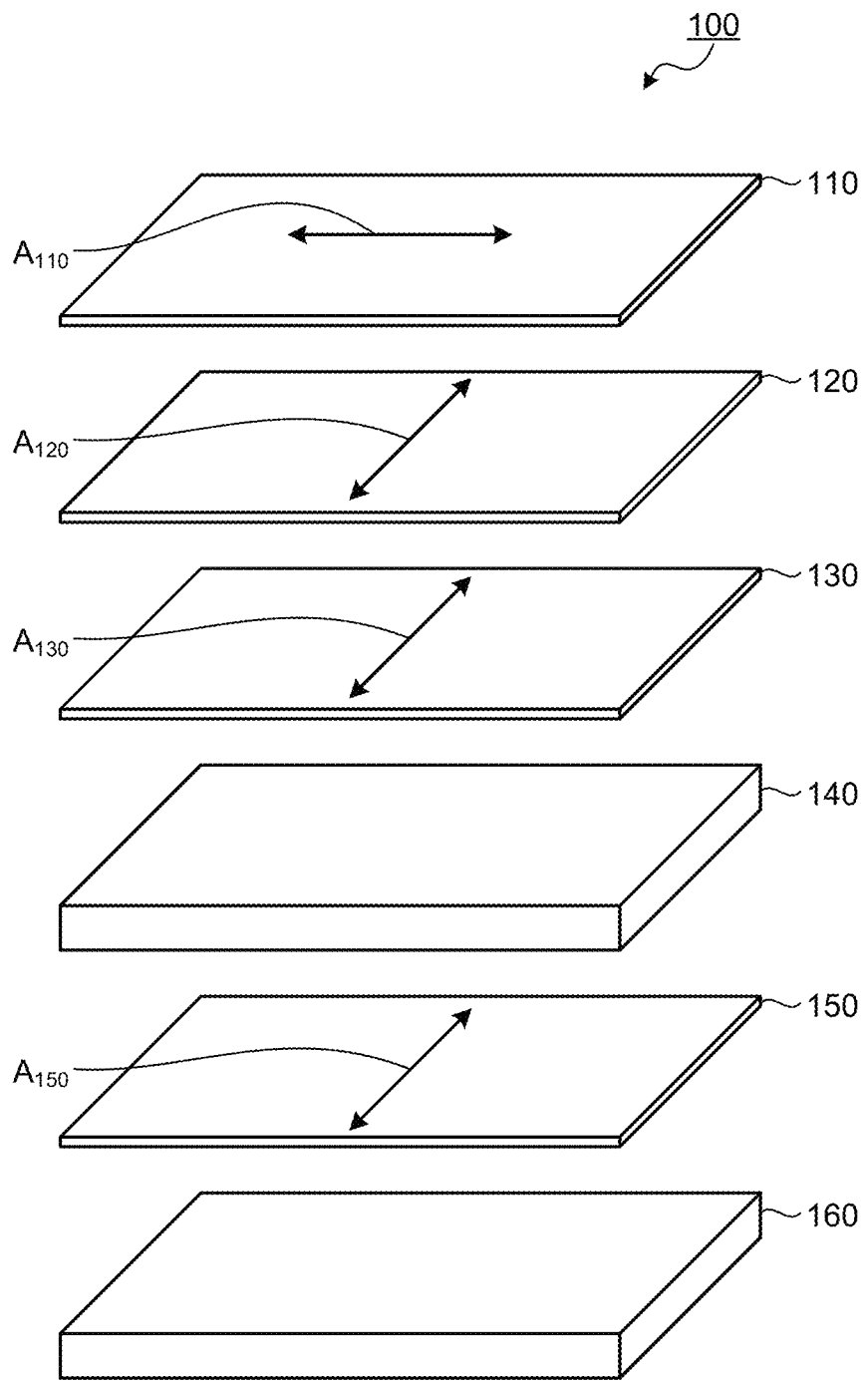
FIG. 2 is an exploded perspective view schematically illustrating a liquid crystal display device according to an embodiment of the present invention.

FIG. 1 is a perspective view schematically illustrating a liquid crystal display device 100 according to an embodiment of the present invention. FIG. 2 is an exploded perspective view schematically illustrating the liquid crystal display device 100 according to an embodiment of the present invention.

As illustrated in FIG. 1 and FIG. 2, the liquid crystal display device 100 according to the embodiment of the present invention includes: a viewing side polarizing plate 110 as a first polarizing plate; an optically anisotropic body (B) 120; an optically anisotropic body (A) 130; a liquid crystal cell 140; a light source side polarizing plate 150 as a second polarizing plate; and a backlight unit 160 as a light source, in this order from the viewing side. In the liquid crystal display device 100 with this structure, light emitted from the backlight unit 160 passes through the light source side polarizing plate 150 thereby to become linearly polarized light, and the linearly polarized light passes through the liquid crystal cell 140, the optically anisotropic body (A) 130, the optically anisotropic body (B) 120, and the viewing side polarizing plate 110 in this order. Accordingly, an image is displayed on a display surface on the viewing side of the viewing side polarizing plate 110. The viewing side refers to a side closer to an observer who observes the liquid crystal display device 100. Usually, the viewing side means a side closer to the display surface of the liquid crystal display device 100. In FIG. 1, an arrow $A_N$ indicates the normal line direction of the display surface, and an arrow $A_C$ indicates the tilt direction of the display surface.

[1.1. First Polarizing Plate 110]

As illustrated in FIG. 2, the viewing side polarizing plate 110 is a polarizing plate having a polarized light transmission axis $A_{110}$. This viewing side polarizing plate 110 has a function with which it can allow linearly polarized light having a vibration direction parallel to the polarized light transmission axis $A_{110}$ to pass therethrough, and absorb other polarized light. The vibration direction of linearly polarized light means the vibration direction of the electric field of linearly polarized light.

[1.2. Optically Anisotropic Body (B) 120]

The optically anisotropic body (B) 120 is a member formed of a material having a positive intrinsic birefringence value. When the member formed of a material having a positive intrinsic birefringence value is used as the optically anisotropic body (B) 120, black brightness can be lowered when the liquid crystal display device is observed from a tilt direction as well as from a front direction. As this optically anisotropic body (B) 120, a film is usually used.

The optically anisotropic body (B) 120 is a member having optical anisotropy, and has a slow axis $A_{120}$ in its plane. The slow axis $A_{120}$ of the optically anisotropic body (B) 120 is approximately perpendicular to the polarized light transmission axis $A_{110}$ of the viewing side polarizing plate 110. That the polarized light transmission axis $A_{110}$ of the viewing side polarizing plate 110 is approximately perpendicular to the slow axis $A_{120}$ of the optically anisotropic body (B) 120 means that an angle formed between the polarized light transmission axis $A_{110}$ and the slow axis $A_{120}$ is usually 85° or more, preferably 88° or more, and more preferably 89° or more, and is usually 95° or less, preferably 92° or less, and more preferably 91° or less. When the slow axis $A_{120}$ of the optically anisotropic body (B) 120 is approximately perpendicular to the polarized light transmission axis $A_{110}$ of the viewing side polarizing plate 110, black brightness can be lowered when the liquid crystal display device is observed from a tilt direction as well as from a front direction.

The in-plane retardation Re(B550) at a wavelength of 550 nm of the optically anisotropic body (B) 120 is usually 200 nm or more, preferably 250 nm or more, and more preferably 300 nm or more, and is usually 500 nm or less, preferably 450 nm or less, and more preferably 400 nm or less. When the in-plane retardation Re(B550) of the optically anisotropic body (B) 120 falls within the aforementioned range, black brightness can be lowered when the liquid crystal display device is observed from a tilt direction as well as from a front direction.

The thickness direction retardation Rth(B550) at a wavelength of 550 nm of the optically anisotropic body (B) 120 is usually 100 nm or more, preferably 125 nm or more, and more preferably 150 nm or more, and is usually 250 nm or less, preferably 225 nm or less, and more preferably 200 nm or less. When the thickness direction retardation Rth(B550) of the optically anisotropic body (B) 120 falls within the aforementioned range, black brightness can be lowered when the liquid crystal display device is observed from a tilt direction as well as from a front direction.

The NZ factor of the optically anisotropic body (B) 120 is preferably 0.90 or more, more preferably 0.95 or more, and particularly preferably 0.98 or more, and is preferably 1.1 or less, more preferably 1.05 or less, and particularly preferably 1.02 or less. When the NZ factor of the optically anisotropic body (B) 120 falls within the aforementioned range, black brightness can be lowered when the liquid crystal display device is observed from a tilt direction as well as from a front direction.

The optically anisotropic body (B) 120 preferably has an in-plane retardation with in-plane retardation values that do not significantly vary depending on a measurement wavelength. Specifically, the in-plane retardation Re(B450) at a wavelength of 450 nm of the optically anisotropic body (B) 120, the in-plane retardation Re(B550) at a wavelength of 550 nm of the optically anisotropic body (B) 120, and the in-plane retardation Re(B650) at a wavelength of 650 nm of the optically anisotropic body (B) 120 preferably satisfy the following formulae (B-I) and (B-II).

$$0.97 \leq Re(B450)/Re(B550) \leq 1.09 \quad \text{(B-I)}$$

$$0.97 \leq Re(B650)/Re(B550) \leq 1.03 \quad \text{(B-II)}$$

More specifically, "Re(B450)/Re(B550)" is preferably 0.97 or more, more preferably 0.98 or more, and particularly preferably 0.99 or more, and is preferably 1.09 or less, more preferably 1.07 or less, and particularly preferably 1.05 or less.

"Re(B650)/Re(B550)" is preferably 0.97 or more, more preferably 0.98 or more, and particularly preferably 0.99 or more, and is preferably 1.03 or less, more preferably 1.02 or less, and particularly preferably 1.01 or less.

When "Re(B450)/Re(B550)" and "Re(B650)/Re(B550)" mentioned above fall within the aforementioned ranges, black brightness can be effectively lowered when the liquid crystal display device is observed from a tilt direction as well as from a front direction.

[1.3. Optically Anisotropic Body (A) 130]

The optically anisotropic body (A) 130 is a member formed of a material having a negative intrinsic birefringence value. When the member formed of a material having a negative intrinsic birefringence value is used as the optically anisotropic body (A) 130, black brightness can be lowered when the liquid crystal display device is observed from a tilt direction as well as from a front direction. As this optically anisotropic body (A) 130, a film is usually used.

The optically anisotropic body (A) 130 is a member having optical anisotropy, and has a slow axis $A_{130}$ in its plane. The slow axis $A_{130}$ of the optically anisotropic body (A) 130 is approximately parallel to the slow axis $A_{120}$ of the optically anisotropic body (B) 120. That the slow axis $A_{130}$ of the optically anisotropic body (A) 130 is approximately parallel to the slow axis $A_{120}$ of the optically anisotropic body (B) 120 means that an angle formed between the slow axis $A_{130}$ and the slow axis $A_{120}$ is usually −5° or more, preferably −2° or more, and more preferably −1° or more, and is usually 5° or less, preferably 2° or less, and more preferably 1° or less. When the slow axis $A_{130}$ of the optically anisotropic body (A) 130 and the slow axis $A_{120}$ of the optically anisotropic body (B) 120 are approximately parallel to each other, black brightness can be lowered when the liquid crystal display device is observed from a tilt direction as well as from a front direction.

The in-plane retardation Re(A550) at a wavelength of 550 nm of the optically anisotropic body (A) 130 is usually 10 nm or more, preferably 15 nm or more, and more preferably 20 nm or more, and is usually 50 nm or less, preferably 45 nm or less, and more preferably 40 nm or less. When the in-plane retardation Re(A550) of the optically anisotropic body (A) 130 falls within the aforementioned range, black brightness can be lowered when the liquid crystal display device is observed from a tilt direction as well as from a front direction.

The thickness direction retardation Rth(A550) at a wavelength of 550 nm of the optically anisotropic body (A) 130 is usually −70 nm or more, preferably −65 nm or more, and more preferably −60 nm or more, and is usually −10 nm or less, preferably −15 nm or less, and more preferably −20 nm or less. When the thickness direction retardation Rth(A550) of the optically anisotropic body (A) 130 falls within the aforementioned range, black brightness can be lowered when the liquid crystal display device is observed from a tilt direction as well as from a front direction.

The NZ factor of the optically anisotropic body (A) 130 is preferably −1.10 or more, more preferably −1.05 or more, and particularly preferably −1.02 or more, and is preferably −0.90 or less, more preferably −0.95 or less, and particularly preferably −0.98 or less. When the NZ factor of the optically anisotropic body (A) 130 falls within the aforementioned range, black brightness can be effectively lowered when the liquid crystal display device is observed from a tilt direction as well as from a front direction.

The optically anisotropic body (A) 130 preferably has an in-plane retardation with in-plane retardation values that do not significantly vary depending on a measurement wavelength. Specifically, the in-plane retardation Re(A450) at a wavelength of 450 nm of the optically anisotropic body (A) 130, the in-plane retardation Re(A550) at a wavelength of 550 nm of the optically anisotropic body (A) 130, and the in-plane retardation Re(A650) at a wavelength of 650 nm of the optically anisotropic body (A) 130 preferably satisfy the following formulae (A-I) and (A-II).

$$0.80 \leq Re(A450)/Re(A550) \leq 1.09 \quad \text{(A-I)}$$

$$0.97 \leq Re(A650)/Re(A550) \leq 1.20 \quad \text{(A-II)}$$

More specifically, "Re(A450)/Re(A550)" is preferably 0.80 or more, more preferably 0.85 or more, and particularly preferably 0.90 or more, and is preferably 1.09 or less, more preferably 1.07 or less, and particularly preferably 1.05 or less.

"Re(A650)/Re(A550)" is preferably 0.97 or more, more preferably 0.98 or more, and particularly preferably 0.99 or more, and is preferably 1.20 or less, more preferably 1.15 or less, and particularly preferably 1.10 or less.

When "Re(A450)/Re(A550)" and "Re(A650)/Re(A550)" mentioned above fall within the aforementioned ranges, black brightness can be effectively lowered when the liquid crystal display device is observed from a tilt direction as well as from a front direction.

[1.4. Liquid Crystal Cell 140]

The liquid crystal cell 140 is an element containing a liquid crystal whose molecular orientation can be changed depending on a voltage applied from an unillustrated electrode, and is provided so as to be capable of optically rotating linearly polarized light that has passed through the light source side polarizing plate 150 depending on the voltage applied. Such a liquid crystal cell 140 usually includes a pair of substrates and a liquid crystal inserted between the substrates.

As such a liquid crystal cell 140, a liquid crystal cell of a horizontal orientation mode is used in the liquid crystal display device 100 according to the present embodiment. In the liquid crystal cell 140 of a horizontal orientation mode, the orientation of liquid crystal molecules is usually changed depending on an applied voltage while the liquid crystal molecules remain parallel to the substrates of the liquid crystal cell 140. Examples of such a liquid crystal cell 140 of a horizontal orientation mode may include a liquid crystal cell of an in-plane switching (IPS) mode, a fringe field switching (FFS) mode, and a ferroelectric liquid crystal (FLC) mode.

[1.5. Light Source Side Polarizing Plate 150]

As illustrated in FIG. 2, the light source side polarizing plate 150 is a polarizing plate having a polarized light transmission axis $A_{150}$. This light source side polarizing plate 150 has a function with which it can allow linearly polarized light having a vibration direction parallel to the polarized light transmission axis $A_{150}$ to pass therethrough and, absorb other polarized light.

The polarized light transmission axis $A_{150}$ of the light source side polarizing plate 150 is approximately perpendicular to the polarized light transmission axis $A_{110}$ of the viewing side polarizing plate 110. That the polarized light transmission axis $A_{110}$ of the viewing side polarizing plate 110 is approximately perpendicular to the polarized light transmission axis $A_{150}$ of the light source side polarizing plate 150 means that an angle formed between the polarized light transmission axis $A_{110}$ and the polarized light transmission axis $A_{150}$ is usually 85° or more, preferably 88° or more, and more preferably 89° or more, and is usually 95° or less, preferably 92° or less, and more preferably 91° or less. With the polarized light transmission axis $A_{110}$ of the viewing side polarizing plate 110 and the polarized light transmission axis $A_{150}$ of the light source side polarizing plate 150 being approximately perpendicular to each other, the image display device 100 can control transmission and interruption of light by means of the liquid crystal cell 140.

[1.6. Backlight Unit 160]

As the backlight unit 160, any light source which can be adopted for liquid crystal display devices may be used without any particular limitation. Specific examples of the backlight unit 160 may include backlight units containing a cold-cathode tube, a light emitting diode, an organic electroluminescence element, and the like.

[1.7. Characteristics of Liquid Crystal Display Device 100]

The liquid crystal display device 100 according to an embodiment of the present invention has the aforementioned structure. In such a liquid crystal display device 100, light emitted from the backlight unit 160 passes through the light source side polarizing plate 150 thereby to become linearly polarized light. The linearly polarized light passes through the viewing side polarizing plate 110, so that an image is displayed on a display surface on the viewing side of the viewing side polarizing plate 110. When a black image is displayed, the linearly polarized light having passed through the light source side polarizing plate 150 is interrupted by the viewing side polarizing plate 110 having the polarized light transmission axis $A_{110}$ which is approximately perpendicular to the polarized light transmission axis $A_{150}$ of the light source side polarizing plate 150. Therefore, light cannot pass through the viewing side polarizing plate 110. Accordingly, brightness is lowered.

Generally regarding liquid crystal display devices, when a display surface of a liquid crystal display device is observed from a tilt direction which is neither parallel nor perpendicular to the display surface, the polarized light transmission axis of a light source side polarizing plate becomes to be in non-perpendicular relationship to the polarized light transmission axis of a viewing side polarizing plate. Consequently, when a black image is displayed on a prior-art liquid crystal display device and the display surface is observed from a tilt direction, a part of light passes through a viewing side polarizing plate, causing a black brightness to increase.

To address this concern, in the liquid crystal display device 100 according to the present embodiment, a combination of the optically anisotropic body (A) 130 and the optically anisotropic body (B) 120 exerts an appropriate polarizing plate compensation function. Therefore, when a black image is displayed on the liquid crystal display device 100 and the device is observed in a tilt direction indicated by arrow $A_C$ in FIG. 1, the linearly polarized light having passed through the light source side polarizing plate 150 is effectively interrupted by the viewing side polarizing plate 110. Thus, with the liquid crystal display device 100 according to the present embodiment, brightness observed from the tilt direction $A_C$ when a black image is displayed can be lowered.

For example, the black brightness when the display surface of the liquid crystal display device 100 according to the present embodiment is observed from a direction at a polar angle θ of 60° and an azimuth angle φ of 45° with respect to the polarized light transmission axis $A_{110}$ of the viewing side polarizing plate 110 as illustrated in FIG. 1 can be made lower than in the prior art. Specifically, the aforementioned black brightness is preferably 1.4 or less, more preferably 1.3 or less, particularly preferably 1.2 or less, and ideally 1.0. The black brightness is in terms of a relative brightness based on a brightness of the backlight unit 160 alone that is lit and observed from a front direction being 100.0.

Furthermore, with the liquid crystal display device 100 according to the present embodiment, brightness observed from a front direction when a black image is displayed can be usually lowered. Specifically, a black brightness when the display surface of the liquid crystal display device 100 is observed from a direction at a polar angle θ of 0° is preferably 0.004 or less, more preferably 0.003 or less, particularly preferably 0.002 or less, and ideally 0. The black brightness is in terms of a relative brightness based on a brightness of the backlight unit 160 alone that is lit and observed from a front direction being 100.0.

Moreover, the liquid crystal display device 100 according to the present embodiment is usually excellent in viewing angle properties. Therefore, an observer can view an image displayed on the display surface of the liquid crystal display device 100 from wide angle ranges.

[1.8. Modification Examples]

Although the liquid crystal display device 100 according to an embodiment of the present invention has been described above, this liquid crystal display device 100 may be further modified for implementation.

For example, the optically anisotropic body (A) 130 and the optically anisotropic body (B) 120 may be bonded together with an adhesive agent or a bonding agent as necessary to provide a single optical layered body. Alternatively, a layered body including a layer corresponding to the optically anisotropic body (A) and a layer corresponding to the optically anisotropic body (B) may be provided, as an alternative element to the optically anisotropic body (A) 130 and the optically anisotropic body (B) 120, to the liquid crystal display device.

The liquid crystal display device 100 may further include an optional constituent element in combination with the aforementioned viewing side polarizing plate 110, optically anisotropic body (B) 120, optically anisotropic body (A) 130, liquid crystal cell 140, light source side polarizing plate 150, and backlight unit 160. Examples of the optional constituent element may include a reflector, a diffuser, a brightness enhancing film, and a protective film.

[2. Constituent Elements]

Subsequently, preferred examples of each of the aforementioned constituent elements of the liquid crystal display device will be more specifically described.

[2.1. Optically Anisotropic Body (A)]

The optically anisotropic body (A) is a member formed of a material having a negative intrinsic birefringence value, and is usually a film of a single-layer structure or a multilayer structure formed of a material having a negative intrinsic birefringence value. As the material having a negative intrinsic birefringence value, a resin having a negative intrinsic birefringence value is usually used. Especially, a thermoplastic resin having a negative intrinsic birefringence value is preferable.

The resin having a negative intrinsic birefringence value usually contains a polymer having a negative intrinsic birefringence value, and may further contain an optional component as necessary. Examples of the polymer having a negative intrinsic birefringence value may include: an aromatic vinyl polymer including a homopolymer of styrene or a styrene derivative as well as a copolymer of styrene or a styrene derivative and any of optional monomers; a (meth) acryl polymer such as polymethyl methacrylate; a (meth) acrylonitrile polymer such as polyacrylonitrile; and a multicomponent copolymer of these. Examples of the optional monomer which is copolymerizable with styrene or a styrene derivative may include acrylonitrile, maleic anhydride, methyl methacrylate, and butadiene. Among these, an aromatic vinyl polymer is preferable from the viewpoint of having high retardation expression properties. As the polymer, one type thereof may be solely used, and two or more types thereof may also be used in combination at any ratio.

Examples of the optional component to be contained in the resin having a negative intrinsic birefringence value may include: a low molecular weight compound described in Japanese Patent Application Laid-Open No. 2011-209627 A; a polymer other than the polymer having a negative intrinsic birefringence value (a polymer having a positive intrinsic birefringence, poly(2,6-dimethyl-1,4-phenylene oxide), and the like); a lubricant; a layered crystal compound; an inorganic fine particle; a stabilizer such as an antioxidant, a thermal stabilizer, a light stabilizer, a weathering stabilizer, an ultraviolet absorber, and a near-infrared absorber; a plasticizer; a coloring agent such as a dye and a pigment; and an antistatic agent. One type thereof may be solely used, and two or more types thereof may also be used in combination at any ratio.

The glass transition temperature $Tg_A$ of the resin having a negative intrinsic birefringence value is preferably 80° C. or higher, more preferably 90° C. or higher, further preferably 100° C. or higher, still further preferably 110° C. or higher, and particularly preferably 120° C. or higher. When the glass transition temperature $Tg_A$ of the resin having a negative intrinsic birefringence value is high in this manner, orientation relaxation of the resin having a negative intrinsic birefringence value can be reduced. Although the upper limit of the glass transition temperature $Tg_A$ of the resin having a negative intrinsic birefringence value is not particularly limited, it is usually 200° C. or lower.

The production method of the optically anisotropic body (A) is not limited. For example, when the optically anisotropic body (A) of a film shape is produced using the resin having a negative intrinsic birefringence value, the optically anisotropic body (A) may be produced by a production method including a first process of producing a pre-stretch film from the resin having a negative intrinsic birefringence value and a second process of stretching this pre-stretch film to obtain the optically anisotropic body (A).

In the first process, the resin having a negative intrinsic birefringence value is molded into a film shape to obtain a pre-stretch film. Examples of the molding method may include a melt molding method and a solution casting method. More specific examples of the melt molding method may include an extrusion molding method, a press molding method, an inflation molding method, an injection molding method, a blow molding method, and a stretch molding method. Among these methods, an extrusion molding method, an inflation molding method, or a press molding method is preferable for obtaining the optically anisotropic body (A) having excellent mechanical strength and surface accuracy. An extrusion molding method is particularly preferable from the viewpoint of enabling efficient and easy production of the pre-stretch film.

When the optically anisotropic body (A) is produced as a multi-layer film including two or more layers, examples of the molding method for obtaining the pre-stretch film may include a coextrusion molding method such as a coextrusion T-die method, a coextrusion inflation method, and a coextrusion lamination method; a film lamination molding method such as dry lamination; and a coating molding method of coating a certain layer with a resin solution which constitutes a layer other than the certain layer. Among these, a coextrusion molding method is preferable, from the viewpoint of favorable production efficiency and prevention of remaining of volatile component such as a solvent in the pre-stretch film. Among the coextrusion molding methods, a coextrusion T-die method is preferable. The coextrusion T die method includes a feedblock system and a multimanifold system. The multimanifold system is further preferable in terms of reduction of fluctuation in film thickness.

The pre-stretch film may usually be obtained as a long-length resin film. The optically anisotropic body (A) can be produced as a long-length film by preparing the pre-stretch film as a long-length resin film. The production process of such a long-length resin film may be performed while the film is continuously conveyed in its lengthwise direction in a production line. Therefore, a portion or an entirety of each production process of the optically anisotropic body (A) may be performed in-line. This enables easy and efficient production.

After the preparation of the pre-stretch film in the first process, the second process of stretching the prepared pre-stretch film is performed. As the stretching method in the second process, any of appropriate ones may be adopted according to optical properties which are desired to be expressed by stretching. For example, stretching to be performed may be uniaxial stretching in which stretching is performed only in one direction, or may be biaxial stretching in which stretching is performed in two different directions. The biaxial stretching to be performed may be simultaneous biaxial stretching in which stretching is simultaneously performed in two directions, or sequential biaxial stretching in which stretching in a certain direction is followed by stretching in another direction. Furthermore, the stretching may be performed by longitudinal stretching in which stretching is performed in the lengthwise direction of the pre-stretch film, lateral stretching in which stretching is performed in the width direction of the pre-stretch film, diagonal stretching in which stretching is performed in a diagonal direction that is neither parallel nor perpendicular to the width direction of the pre-stretch film, and a combination thereof.

Among these, biaxial stretching is preferable, and simultaneous biaxial stretching is preferable, from the viewpoint of efficient expression of a desired retardation in the optically anisotropic body (A). When the biaxial stretching is performed, the stretching directions to be adopted are usually two directions orthogonal to each other. For example, when the pre-stretch film is a long-length film, the stretching directions to be adopted may be a lengthwise direction and a width direction. When the sequential biaxial stretching is performed, free-end uniaxial stretching in a lengthwise direction, and subsequent fixed-end uniaxial stretching in a width direction may be performed.

The stretching temperature and the stretching factor may be any values as long as the optically anisotropic body (A) having desired optical properties can be obtained. Specifically, the stretching factor in a lengthwise direction is preferably 1.80 times or more, more preferably 1.85 times or more, and particularly preferably 1.90 times or more, and is preferably 2.20 times or less, more preferably 2.15 times or less, and particularly preferably 2.10 times or less. The stretching factor in a width direction is preferably 1.10 times or more, more preferably 1.15 times or more, and particularly preferably 1.20 times or more, and is preferably 1.40 times or less, more preferably 1.35 times or less, and particularly preferably 1.30 times or less. The stretching temperature is preferably $Tg_A-10°$ C. or higher, more preferably $Tg_A-5°$ C. or higher, and particularly preferably $Tg_A-2°$ C. or higher, and is preferably $Tg_A+30°$ C. or lower, more preferably $Tg_A+25°$ C. or lower, and particularly preferably $Tg_A+20°$ C. or lower.

By the aforementioned stretching, molecules of polymers contained in the pre-stretch film are oriented, so that desired optical properties are expressed. Accordingly, the optically anisotropic body (A) may be obtained. The optically anisotropic body (A) obtained in this manner is, as necessary, bonded to another optical member, or cut out into a shape suitable for provision to a liquid crystal display device and then provided to the liquid crystal display device.

The production method of the optically anisotropic body (A) satisfying the aforementioned formulae (A-I) and (A-II) is not particularly limited. For example, a method of the following (a-i) or (a-ii) may be adopted in the aforementioned production method.

(a-i) As the resin having a negative intrinsic birefringence value, a resin containing an aromatic vinyl polymer and a low molecular weight compound described in Japanese Patent Application Laid-Open No. 2011-209627 A is used. The "low molecular weight compound described in Japanese Patent Application Laid-Open No. 2011-209627 A" means a "low molecular weight compound having a long chain which contains a carbon atom chain with a carbon-carbon unsaturated bond and an aromatic group bound to one or both of terminals of the carbon atom chain, in which a π electron conjugated system is formed along the carbon atom chain and the aromatic group in the long chain".

(a-ii) As the optically anisotropic body (A), there is formed a three-layer film which contains a (meth)acrylic resin layer containing a (meth)acryl polymer/an aromatic vinyl resin layer containing an aromatic vinyl polymer/a (meth)acrylic resin layer containing a (meth)acryl polymer in this order.

The thickness of the optically anisotropic body (A) is preferably 40 μm or more, more preferably 50 μm or more, and particularly preferably 60 μm or more, and is preferably 110 μm or less, more preferably 100 μm or less, and particularly preferably 90 μm or less. When the thickness of the optically anisotropic body (A) is equal to or more than the lower limit value of the aforementioned range, a desired retardation is easily expressed. When the thickness thereof is equal to or less than the upper limit value of the aforementioned range, the thickness of the liquid crystal display device can be reduced.

[Optically Anisotropic Body (B)]

The optically anisotropic body (B) is a member formed of a material having a positive intrinsic birefringence value, and is usually a film of single-layer structure or a multi-layer structure formed of a material having a positive intrinsic birefringence value. As the material having a positive intrinsic birefringence value, a resin having a positive intrinsic birefringence value is usually used. Especially, a thermoplastic resin having a positive intrinsic birefringence value is preferable.

The resin having a positive intrinsic birefringence value usually contains a polymer having a positive intrinsic birefringence value, and may further contain an optional component as necessary. Examples of the polymer having a positive intrinsic birefringence value may include: a linear olefin polymer such as polyethylene and polypropylene; a cyclic olefin polymer such as a norbornene-based polymer; a polyester polymer such as polyethylene terephthalate and polybutylene terephthalate; a polyarylene sulfide polymer such as polyphenylene sulfide; a polyvinyl alcohol polymer; a polycarbonate polymer; a polyarylate polymer; a cellulose ester polymer; a polyether sulfone polymer; a polysulfone polymer; a polyallyl sulfone polymer; a polyvinyl chloride polymer; and a rod-like liquid crystal polymer. Among these, a polycarbonate polymer is preferable from the viewpoint of retardation expression properties and low-temperature stretching properties. As the polymer, one type thereof may be solely used, and two or more types thereof may also be used in combination at any ratio. The polymer may be either a homopolymer or a copolymer.

Examples of the optional component to be contained in the resin having a positive intrinsic birefringence value may include: a lubricant; a layered crystal compound; an inorganic fine particle; a stabilizer such as an antioxidant, a thermal stabilizer, a light stabilizer, a weathering stabilizer, an ultraviolet absorber, and a near-infrared absorber; a plasticizer; a coloring agent such as a dye and a pigment; and an antistatic agent. One type thereof may be solely used, and two or more types thereof may also be used in combination at any ratio.

The glass transition temperature $Tg_B$ of the resin having a positive intrinsic birefringence value is preferably 80° C. or higher, more preferably 90° C. or higher, further preferably 100° C. or higher, still further preferably 110° C. or higher, and particularly preferably 120° C. or higher. When the glass transition temperature $Tg_B$ of the resin having a positive intrinsic birefringence value is high in this manner, orientation relaxation of the resin having a positive intrinsic birefringence value can be reduced. Although the upper limit of the glass transition temperature $Tg_B$ of the resin having a positive intrinsic birefringence value is not particularly limited, it is usually 200° C. or lower.

The production method of the optically anisotropic body (B) is not limited. For example, when the optically anisotropic body (B) of a film shape is produced using the resin having a positive intrinsic birefringence value, the optically anisotropic body (B) may be produced by a production method including a third process of producing a pre-stretch film from the resin having a positive intrinsic birefringence value and a fourth process of stretching this pre-stretch film to obtain the optically anisotropic body (B).

In the third process, the resin having a positive intrinsic birefringence value is molded into a film shape to obtain a pre-stretch film. As the molding method, any method may be adopted from the range of the molding method having been described in the production method of the optically anisotropic body (A).

After the preparation of the pre-stretch film in the third process, the fourth process of stretching the prepared pre-stretch film is performed. As the stretching method in the fourth process, any of appropriate ones may be adopted according to optical properties which are desired to be expressed by stretching. Although the stretching may be performed by biaxial stretching, uniaxial stretching is preferable, and free-end uniaxial stretching is more preferable, from the viewpoint of efficient expression of desired optical properties.

The stretching temperature and the stretching factor may be any values as long as the optically anisotropic body (B) having desired optical properties can be obtained. Specifically, the stretching factor is preferably 1.1 times or more, more preferably 1.2 times or more, and particularly preferably 1.3 times or more, and is preferably 2.0 times or less, more preferably 1.8 times or less, and particularly preferably 1.6 times or less. The stretching temperature is preferably $Tg_B-10°$ C. or higher, more preferably $Tg_B-5°$ C. or higher, and particularly preferably $Tg_B-2°$ C. or higher, and is preferably $Tg_B+30°$ C. or lower, more preferably $Tg_B+25°$ C. or lower, and particularly preferably $Tg_B+20°$ C. or lower.

By the aforementioned stretching, molecules of polymers contained in the pre-stretch film are oriented, so that desired optical properties are expressed. Accordingly, the optically anisotropic body (B) may be obtained.

When it is desired to obtain the optically anisotropic body (B) having a large in-plane retardation, the optically anisotropic body (B) may be produced by bonding multiple films produced by the aforementioned production method.

The optically anisotropic body (B) obtained in this manner is, as necessary, bonded to another optical member, or cut out into a shape suitable for provision to a liquid crystal display device and then provided to the liquid crystal display device.

The production method of the optically anisotropic body (B) satisfying the aforementioned formulae (B-I) and (B-II) is not particularly limited. For example, a method of the following (b-i) or (b-ii) may be adopted in the aforementioned production method.

(b-i) As the resin having a positive intrinsic birefringence value, a resin described in Japanese Patent No. 4726148 B is used.

(b-ii) As the resin having a positive intrinsic birefringence value, a polycarbonate resin having a fluorene skeleton described in Japanese Patent Application Laid-Open No. 2002-221622 A is used.

The thickness of the optically anisotropic body (B) is preferably 50 μm or more, more preferably 60 μm or more, and particularly preferably 70 μm or more, and is preferably 160 µm or less, more preferably 150 µm or less, and particularly preferably 140 µm or less. When the thickness of the optically anisotropic body (B) is equal to or more than the lower limit value of the aforementioned range, a desired retardation is easily expressed. When the thickness thereof is equal to or less than the upper limit value of the aforementioned range, the thickness of the liquid crystal display device can be reduced.

[Polarizing Plate]

The polarizing plate usually includes a polarizer, and, as necessary, a protective film for protecting the polarizer.

An example of the polarizer to be used may be a polarizer obtained by subjecting a film of an appropriate vinyl alcohol-based polymer such as polyvinyl alcohol and partially formalized polyvinyl alcohol to appropriate treatments such as dyeing with a dichronic material such as iodine and a dichroic dye, stretching, and crosslinking in an appropriate order and method. In the stretching for producing the polarizer, a long-length pre-stretch film is usually stretched in a lengthwise direction. Therefore, in the resulting polarizer, a polarized light absorption axis parallel to the lengthwise direction of the polarizer may be expressed. This polarizer is capable of absorbing linearly polarized light having a vibration direction parallel to the polarized light absorption axis. Particularly, a polarizer having excellent polarization degree is preferable. The thickness of the polarizer is generally 5 µm to 80 µm, although the thickness is not limited thereto.

As the protective film for protecting the polarizer, any transparent film may be used. Especially, a film of a resin which is excellent in transparency, mechanical strength, heat stability, moisture-blocking properties, and the like is preferable. Examples of such a resin may include an acetate resin such as triacetyl cellulose, a polyester resin, a polyether sulfone resin, a polycarbonate resin, a polyamide resin, a polyimide resin, a linear olefin resin, a cyclic olefin resin, and a (meth)acrylic resin.

[Liquid Crystal Cell]

Examples of the liquid crystal cell of a horizontal orientation mode may include liquid crystal cells of the IPS mode, FFS mode, and FLC mode, as described above. Examples of a liquid crystal used for such drive modes may include a nematic liquid crystal and a smectic liquid crystal. Usually, a nematic liquid crystal is used for the IPS mode and the FFS mode, and a smectic liquid crystal is used for the FLC mode.

In the IPS mode, liquid crystal molecules are homogeneously oriented in a state without an electric field, and a response of the molecules is caused by an electric field parallel to a substrate (also referred to as a transverse electric field), taking advantage of the electrically controlled birefringence (ECB) effect. The electric field parallel to a substrate may be generated by, for example, a counter electrode and a pixel electrode which are formed of metal. More specifically, for example, in a normally black mode, black image display in a state without an electric field is achieved by orthogonally disposing the upper and lower polarizing plates while the orientation direction of the liquid crystal cell during no application of an electric filed coincides with the polarized light absorption axis of the polarizer on one side. While an electric field exists, liquid crystal molecules rotate while remaining parallel relationship to the substrate, to thereby bring about a degree of transmittance corresponding to the rotation angle (see "Monthly Display, July" published by Techno Times Co., Ltd., pp. 83-88 (1997), and "Liquid Crystal vol. 2 No. 4" published by Japanese Liquid Crystal Society, pp. 303-316 (1998)). The IPS mode encompasses a super in-place switching (S-IPS) mode and an advanced super in-plane switching (AS-IPS) mode which adopt a V-shaped electrode, a zigzag electrode, or the like.

In the FFS mode, liquid crystal molecules are oriented into a homogeneous molecular alignment in a state without an electric field, and a response of the molecules is caused by an electric field parallel to a substrate (also referred to as a transverse electric field), taking advantage of the electrically controlled birefringence effect. The electric field parallel to a substrate may be generated by, for example, a counter electrode and a pixel electrode which are formed with a transparent conductor. The transverse electric field in the FFS mode is also referred to as a fringe electric field. This fringe electric field may be generated when the distance between the counter electrode and the pixel electrode which are formed of a transparent conductor is set to be narrower than the cell gap. More specifically, for example, in a normally black mode, black image display in a state without an electric field is achieved by orthogonally disposing the upper and lower polarizing plates while the orientation direction of the liquid crystal cell during no application of an electric filed coincides with the polarized light absorption axis of the polarizer on one side. While an electric field exists, liquid crystal molecules rotate while remaining parallel relationship to a substrate, to thereby bring about a degree of transmittance corresponding to the rotation angle (see Society for Information Display (SID) 2001 Digest, pp. 484-487, and Japanese Patent Application Laid-Open No. 2002-031812 A). The FFS mode encompasses an advanced fringe field switching (A-FFS) mode and an ultra fringe field switching (U-FFS) mode which adopt a V-shaped electrode, a zigzag electrode, or the like.

The FLC mode takes advantage of the property that when a ferroelectric chiral smectic liquid crystal is sealed in between electrode substrates each having a thickness of about 1 µm to 2 µm, two stable molecular orientation states are exhibited. More specifically, the ferroelectric chiral smectic liquid crystal molecules are rotated in a plane parallel to a substrate by an applied voltage for achieving response. This FLC mode can obtain black and white display on the same principle as the aforementioned IPS mode and FFS mode. Furthermore, the FLC mode has a response speed which is faster than those of other drive modes. The FLC mode encompasses a surface stabilization (SS-FLC) mode, an antiferroelectric (AFLC) mode, a polymer stabilization (PS-FLC) mode, and a V-shaped property (V-FLC) mode.

EXAMPLES

Hereinafter, the present invention will be specifically described by illustrating Examples. However, the present invention is not limited to the following Examples. The present invention may be optionally modified for implementation without departing from the scope of claims of the present invention and its equivalents. The following operation was performed under the conditions of normal temperature and normal pressure in an atmospheric air, unless otherwise stated.

I. Examples and Comparative Examples by Simulation

Example 1

Using a simulator for liquid crystal display devices ("LCD Master" manufactured by Shintec, Inc.), a liquid crystal display device 100 as illustrated in FIG. 1 and FIG. 2 was set. This liquid crystal display device 100 includes a viewing side polarizing plate 110, an optically anisotropic body (B) 120, an optically anisotropic body (A) 130, a liquid crystal cell 140, a light source side polarizing plate 150, and a backlight unit 160, in this order. A polarized light transmission axis $A_{110}$ of the viewing side polarizing plate 110 and a polarized light transmission axis $A_{150}$ of the light source side polarizing plate 150 were set to be perpendicular to each other. The polarized light transmission axis $A_{110}$ of the viewing side polarizing plate 110 and an in-plane slow axis $A_{120}$ of the optically anisotropic body (B) 120 were set to be perpendicular to each other. The in-plane slow axis $A_{120}$ of the optically anisotropic body (B) 120 and an in-plane slow axis $A_{130}$ of the optically anisotropic body (A) 130 were set to be parallel to each other.

In such a liquid crystal display device 100, retardations of the optically anisotropic body (A) 130 and the optically anisotropic body (B) 120 were set as indicated in Table 1, and a brightness when black image is displayed was calculated. The calculation was performed by optical simulation using a 2×2 matrix method. The measurement of brightness was performed in increments of 5° within a polar angle range of 0° to 80° in the polar angle direction and in increments of 5° within an azimuth angle range of 0° to 360° in the azimuth angle direction. The value of the calculated brightness was expressed as a relative brightness based on a brightness of the backlight unit 160 alone that was lit and observed from a front direction being 100.0. The measurement result was displayed as a contour diagram.

In the aforementioned simulation, the following data were used as data of the liquid crystal cell 140, the polarizing plates 110 and 150, and the backlight unit 160.

(i) As the data of the liquid crystal cell 140, there were used data of an IPS mode liquid crystal cell for a liquid crystal display device "iPad 2" manufactured by Apple Inc. The data of the liquid crystal cell 140 were those obtained by disassembling the iPad 2 and measuring the liquid crystal material and the liquid crystal orientation.

(ii) As the data of the polarizing plates 110 and 150, there were used data obtained by disassembling a liquid crystal display device "iPad 2" manufactured by Apple Inc. and measuring the polarizing plate.

(iii) As the data of the backlight unit 160, there were used data obtained by disassembling a liquid crystal display device "iPad 2" manufactured by Apple Inc. and measuring the backlight unit.

Examples 2 to 6 and Comparative Examples 1, 2 and 4

A brightness a liquid crystal display device when a black image is displayed was calculated in the same manner as that in Example 1, except that the retardation values set for the optically anisotropic body (A) and the optically anisotropic body (B) were changed as shown in Table 1 or Table 2.

Comparative Example 3

The positions of the optically anisotropic body (A) and the optically anisotropic body (B) were changed such that the liquid crystal display device includes the viewing side polarizing plate, the liquid crystal cell, the optically anisotropic body (A), the optically anisotropic body (B), the light source side polarizing plate, and the backlight unit, in this order. The directions of the in-plane slow axes of the optically anisotropic body (B) and the optically anisotropic body (A) were changed such that the polarized light transmission axis of the viewing side polarizing plate, the in-plane slow axis of the optically anisotropic body (B), and the in-plane slow axis of the optically anisotropic body (A) are parallel to each other. Furthermore, the retardation values set for the optically anisotropic body (A) and the optically anisotropic body (B) were changed as shown in Table 2. A brightness of the liquid crystal display device when a black image is displayed was calculated in the same manner as that in Example 1 except for the aforementioned matters.

[Results]

The results of Examples 1 to 6 and Comparative Examples 1 to 4 mentioned above are shown in Table 1 and Table 2 as well as FIG. 3 to FIG. 12.

In the following tables, abbreviations mean as follows.
NZ: NZ factor
"Front direction" in the rows of "Black brightness": a black brightness when it is observed from the front direction of the display surface
"Tilt direction" in the rows of "Black brightness": a black brightness when the display surface is observed from a direction at a polar angle of 60° and at an azimuth angle of 45° with respect to the polarized light transmission axis of the viewing side polarizing plate

TABLE 1

| Settings for Examples 1 to 6 and results thereof | | | | | | |
|---|---|---|---|---|---|---|
| | Ex. 1 | Ex. 2 | Ex. 3 | Ex. 4 | Ex. 5 | Ex. 6 |
| Optically anisotropic body (B) | | | | | | |
| Re (B550) [nm] | 337.5 | 225.0 | 450.0 | 337.5 | 328.3 | 328.3 |
| Rth (B550) [nm] | 172.1 | 114.7 | 229.4 | 172.1 | 164.2 | 164.2 |
| NZ | 1.0 | 1.0 | 1.0 | 1.0 | 1.0 | 1.0 |
| Re (B450)/ Re (B550) | 1.00540 | 1.00540 | 1.00540 | 1.10594 | 0.81818 | 0.81818 |
| Re (B650)/ Re (B550) | 0.99691 | 0.99691 | 0.99691 | 0.89721 | 1.18182 | 1.18182 |

TABLE 1-continued

Settings for Examples 1 to 6 and results thereof

Figure 3:
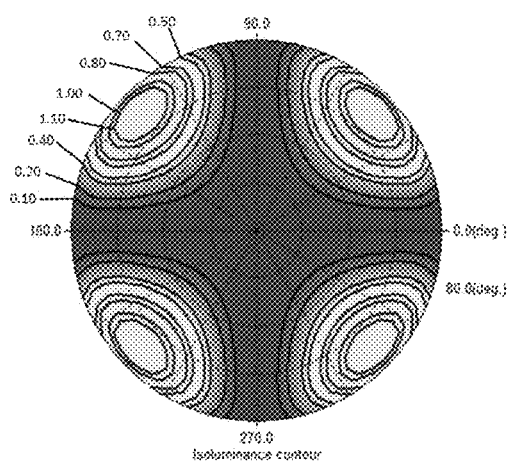
FIG. 3 is a contour diagram illustrating a brightness of a liquid crystal display device when a black image is displayed, calculated by simulation in Example 1 of the present invention.
Figure 4:
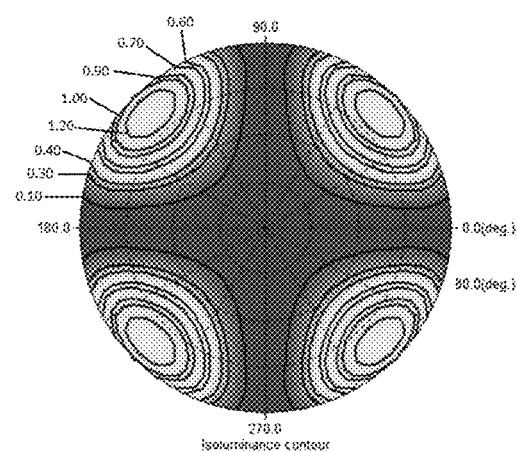
FIG. 4 is a contour diagram illustrating a brightness of a liquid crystal display device when a black image is displayed, calculated by simulation in Example 2 of the present invention.
Figure 5:
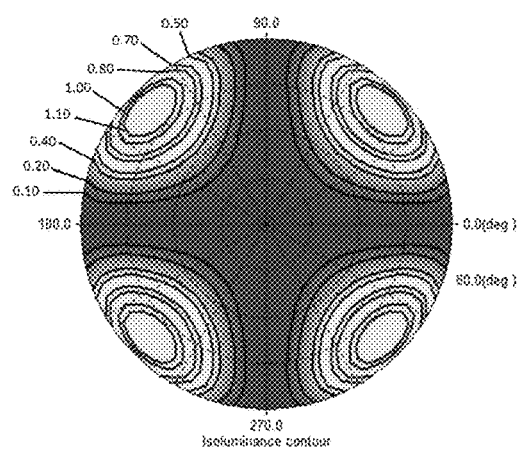
FIG. 5 is a contour diagram illustrating a brightness of a liquid crystal display device when a black image is displayed, calculated by simulation in Example 3 of the present invention.
Figure 6:
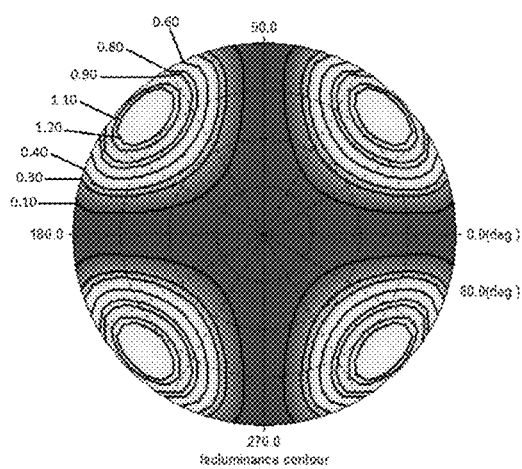
FIG. 6 is a contour diagram illustrating a brightness of a liquid crystal display device when a black image is displayed, calculated by simulation in Example 4 of the present invention.
Figure 7:
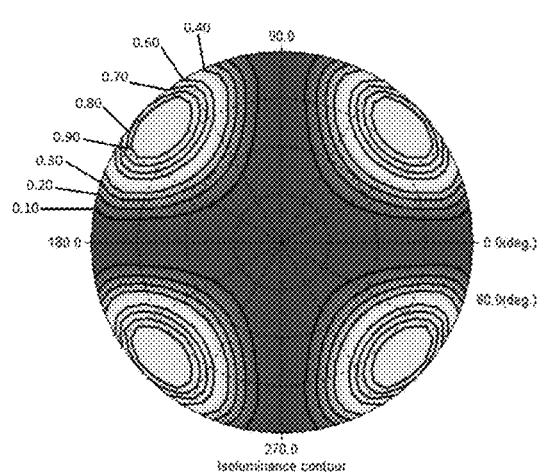
FIG. 7 is a contour diagram illustrating a brightness of a liquid crystal display device when a black image is displayed, calculated by simulation in Example 5 of the present invention.
Figure 8:
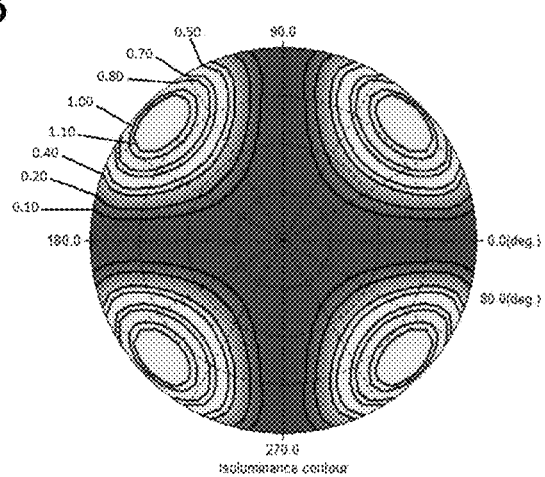
FIG. 8 is a contour diagram illustrating a brightness of a liquid crystal display device when a black image is displayed, calculated by simulation in Example 6 of the present invention.
Figure 9:
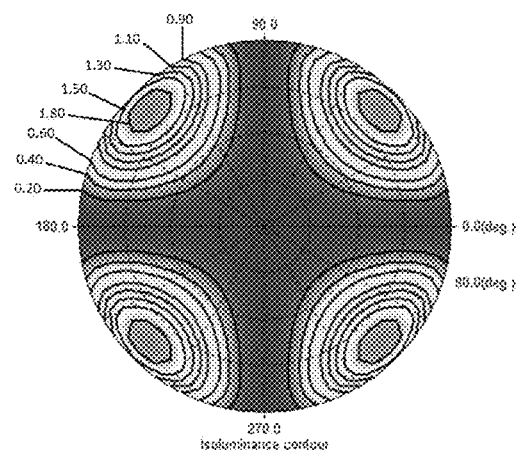
FIG. 9 is a contour diagram illustrating a brightness of a liquid crystal display device when a black image is displayed, calculated by simulation in Comparative Example 1.
Figure 10:
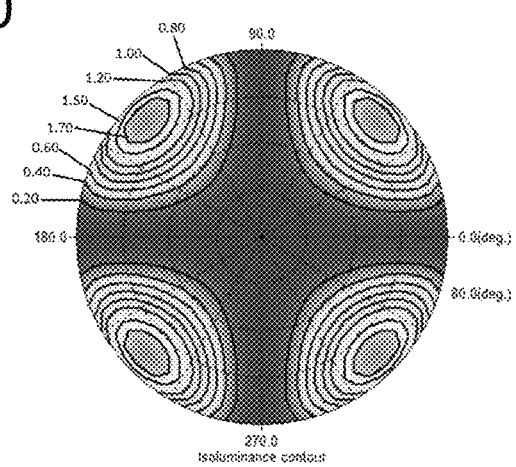
FIG. 10 is a contour diagram illustrating a brightness of a liquid crystal display device when a black image is displayed, calculated by simulation in Comparative Example 2.
Figure 11:
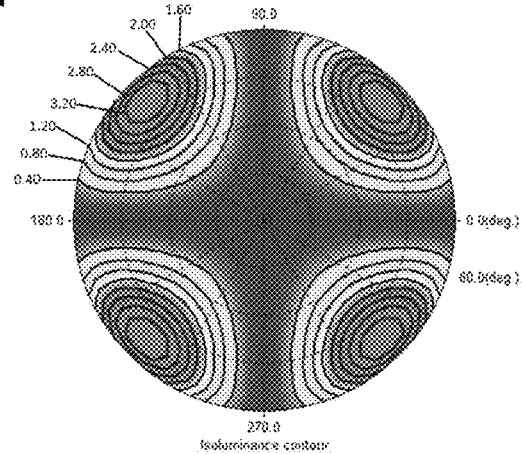
FIG. 11 is a contour diagram illustrating a brightness of a liquid crystal display device when a black image is displayed, calculated by simulation in Comparative Example 3.
Figure 12:
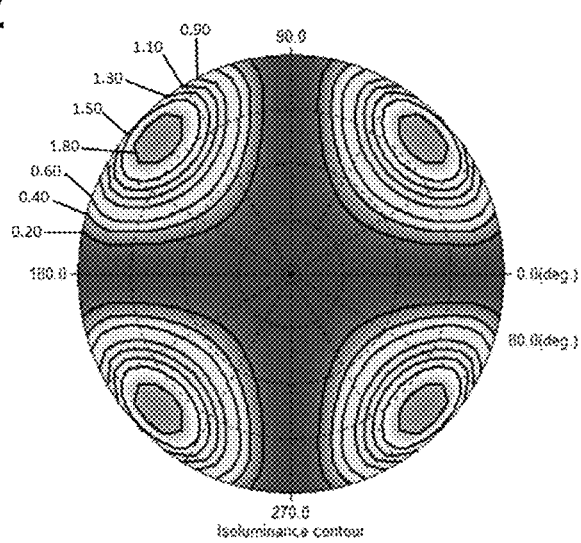
FIG. 12 is a contour diagram illustrating a brightness of a liquid crystal display device when a black image is displayed, calculated by simulation in Comparative Example 4.

|  | Ex. 1 | Ex. 2 | Ex. 3 | Ex. 4 | Ex. 5 | Ex. 6 |
|---|---|---|---|---|---|---|
| Optically anisotropic body (A) | | | | | | |
| Re (A550) [nm] | 37.5 | 45.0 | 18.8 | 37.5 | 37.5 | 37.5 |
| Rth (A550) [nm] | −56.3 | −67.5 | −28.1 | −56.3 | −56.3 | −56.2 |
| NZ | −1.0 | −1.0 | −1.0 | −1.0 | −1.0 | −1.0 |
| Re (A450)/Re (A550) | 1.01021 | 1.01021 | 1.01021 | 1.11123 | 1.01021 | 0.99399 |
| Re (A650)/Re (A550) | 0.99445 | 0.99445 | 0.99445 | 0.89501 | 0.99445 | 1.00122 |
| Black brightness | | | | | | |
| Front direction | 0.06164 | 0.00164 | 0.00164 | 0.00163 | 0.00163 | 0.00163 |
| Tilt direction | 1.05474 | 1.12336 | 1.04531 | 1.16374 | 0.90403 | 1.06648 |
|  | FIG. 3 | FIG. 4 | FIG. 5 | FIG. 6 | FIG. 7 | FIG. 8 |

TABLE 2

[Settings for Comparative Examples 1 to 4 and results thereof]

|  | Comp. Ex. 1 | Comp. Ex. 2 | Comp. Ex. 3 | Comp. Ex. 4 |
|---|---|---|---|---|
| Optically anisotropic body (B) | | | | |
| Re (B550) [nm] | 90.0 | 118.0 | 337.5 | 157.0 |
| Rth (B550) [nm] | 79.0 | 81.0 | 172.1 | 80.0 |
| NZ | 1.4 | 1.2 | 1.0 | 1.0 |
| Re (B450)/Re (B550) | 1.00540 | 1.00540 | 1.00540 | 1.00540 |
| Re (B650)/Re (B550) | 0.99691 | 0.99691 | 0.99691 | 0.99691 |
| Optically anisotropic body (A) | | | | |
| Re (A550) [nm] | 60.0 | 60.0 | 37.5 | 75.0 |
| Rth (A550) [nm] | −90.0 | −90.0 | −56.3 | −112.0 |
| NZ | −1.0 | −1.0 | −1.0 | −1.0 |
| Re (A450)/Re (A550) | 1.01021 | 1.01021 | 1.01021 | 1.01021 |
| Re (A650)/Re (A550) | 0.99445 | 0.99445 | 0.99445 | 0.99445 |
| Black brightness | | | | |
| Front direction | 0.00164 | 0.00164 | 0.00163 | 0.00164 |
| Tilt direction | 1.62903 | 1.56367 | 2.93621 | 1.63675 |
|  | FIG. 9 | FIG. 10 | FIG. 11 | FIG. 12 |

REFERENCE SIGN LIST

100 liquid crystal display device
110 viewing side polarizing plate
120 optically anisotropic body (B)
130 optically anisotropic body (A)
140 liquid crystal cell
150 light source side polarizing plate
160 backlight unit

The invention claimed is:

1. A liquid crystal display device comprising a first polarizing plate, an optically anisotropic body (B), an optically anisotropic body (A), a liquid crystal cell of a horizontal orientation mode, and a second polarizing plate having a polarized light transmission axis which is approximately perpendicular to a polarized light transmission axis of the first polarizing plate, in this order from a viewing side, wherein the optically anisotropic body (A) is formed of a material having a negative intrinsic birefringence value,
the optically anisotropic body (B) is formed of a material having a positive intrinsic birefringence value,
an in-plane slow axis of the optically anisotropic body (A) and an in-plane slow axis of the optically anisotropic body (B) are approximately parallel to each other,
the in-plane slow axis of the optically anisotropic body (B) is approximately perpendicular to the polarized light transmission axis of the first polarizing plate,
an in-plane retardation Re(A550) at a wavelength of 550 nm of the optically anisotropic body (A) is 10 nm or more and 50 nm or less,
a thickness direction retardation Rth(A550) at a wavelength of 550 nm of the optically anisotropic body (A) is −70 nm or more and −10 nm or less,
an in-plane retardation Re(B550) at a wavelength of 550 nm of the optically anisotropic body (B) is 200 nm or more and 500 nm or less, and
a thickness direction retardation Rth(B550) at a wavelength of 550 nm of the optically anisotropic body (B) is 100 nm or more and 250 nm or less.

2. The liquid crystal display device according to claim 1, wherein
an in-plane retardation Re(A450) at a wavelength of 450 nm, the in-plane retardation Re(A550) at a wavelength of 550 nm, and an in-plane retardation Re(A650) at a wavelength of 650 nm of the optically anisotropic body (A) satisfy
0.80≤Re(A450)/Re(A550)≤1.09 and
0.97≤Re(A650)/Re(A550)≤1.20, and an in-plane retardation Re(B450) at a wavelength of 450 nm, the in-plane retardation Re(B550) at a wavelength of 550 nm, and, an in-plane retardation Re(B650) at a wavelength of 650 nm of the optically anisotropic body (B) satisfy 0.97≤Re(B450)/Re(B550)≤1.09 and
0.97≤Re(B650)/Re(B550)≤1.03.

3. The liquid crystal display device according to claim 2, comprising the first polarizing plate, the optically anisotropic body (B), the optically anisotropic body (A), the liquid crystal cell, the second polarizing plate, and a backlight unit, in this order, wherein a black brightness of the liquid crystal display device when the liquid crystal display device is observed from a direction at a polar angle of 60° and an azimuth angle of 45° with respect to the polarized light transmission axis of the first polarizing plate is 1.4 or less, in terms of a relative brightness based on a brightness of the backlight unit alone that is lit and observed from a front direction being 100.0.

4. The liquid crystal display device according to claim 1, comprising the first polarizing plate, the optically anisotropic body (B), the optically anisotropic body (A), the liquid crystal cell, the second polarizing plate, and a backlight unit, in this order, wherein a black brightness of the liquid crystal display device when the liquid crystal display device is observed from a direction at a polar angle of 60° and an azimuth angle of 45° with respect to the polarized light transmission axis of the first polarizing plate is 1.4 or less, in terms of a relative brightness based on a brightness of the backlight unit alone that is lit and observed from a front direction being 100.0.

* * * * *